Figure 1:
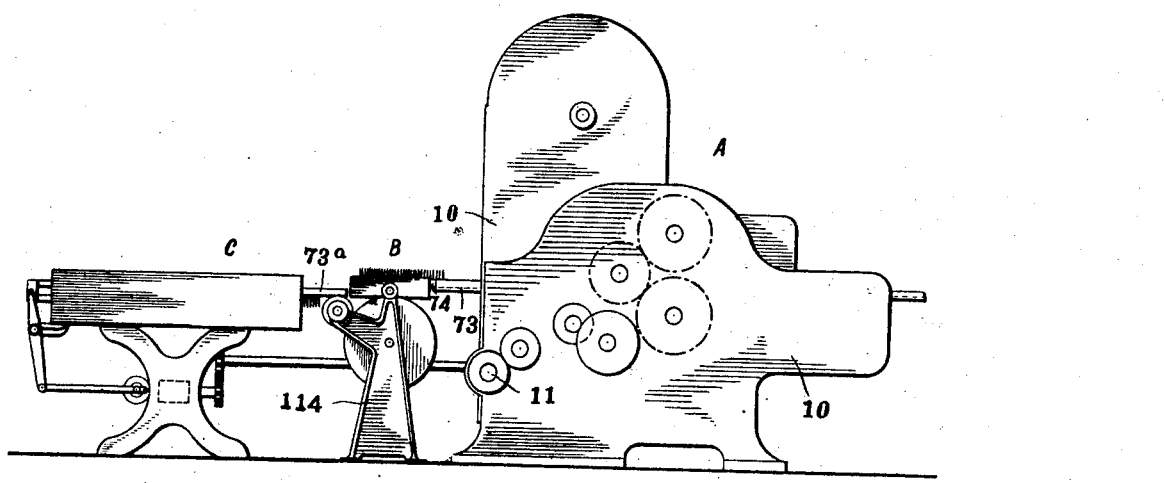

No. 866,650. PATENTED SEPT. 24, 1907.
W. F. HUTCHINSON.
MATCH MACHINE.
APPLICATION FILED OCT. 24, 1906.

14 SHEETS—SHEET 1.

No. 866,650. PATENTED SEPT. 24, 1907.
W. F. HUTCHINSON.
MATCH MACHINE.
APPLICATION FILED OCT. 24, 1906.

14 SHEETS—SHEET 2.

No. 866,650. PATENTED SEPT. 24, 1907.
W. F. HUTCHINSON.
MATCH MACHINE.
APPLICATION FILED OCT. 24, 1906.

14 SHEETS—SHEET 3.

Witnesses
William F. Hutchinson, Inventor
By his Attorney W. B. Hutchinson.

No. 866,650. PATENTED SEPT. 24, 1907.
W. F. HUTCHINSON.
MATCH MACHINE.
APPLICATION FILED OCT. 24, 1906.

14 SHEETS—SHEET 6.

No. 866,650. PATENTED SEPT. 24, 1907.
W. F. HUTCHINSON.
MATCH MACHINE.
APPLICATION FILED OCT. 24, 1906.

14 SHEETS—SHEET 7.

No. 866,650.

PATENTED SEPT. 24, 1907.

W. F. HUTCHINSON.
MATCH MACHINE.
APPLICATION FILED OCT. 24, 1906.

14 SHEETS—SHEET 8.

No. 866,650.
PATENTED SEPT. 24, 1907.
W. F. HUTCHINSON.
MATCH MACHINE.
APPLICATION FILED OCT. 24, 1906.
14 SHEETS—SHEET 9.
FIG. 9
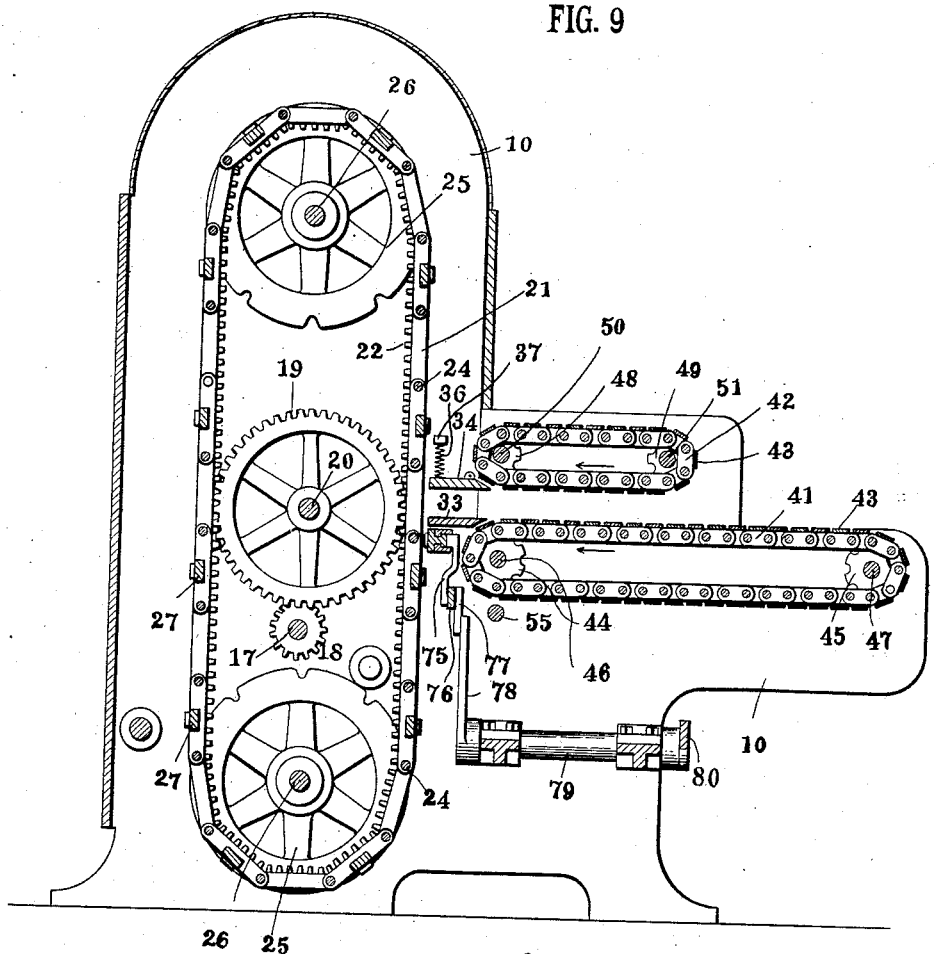
FIG. 9ª
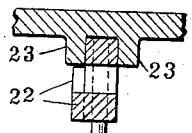
Witnesses
Max B. A. Doring
Frank L. Stubb
William F. Hutchinson, Inventor
By his Attorney W. B. Hutchinson No. 866,650.

PATENTED SEPT. 24, 1907.

W. F. HUTCHINSON.
MATCH MACHINE.
APPLICATION FILED OCT. 24, 1906.

14 SHEETS—SHEET 10.

Witnesses
Max B. A. Doring.
Frank L. Stubbs.

William F. Hutchinson Inventor
By his Attorney A. B. Hutchinson.

No. 866,650.

PATENTED SEPT. 24, 1907.

W. F. HUTCHINSON.
MATCH MACHINE.
APPLICATION FILED OCT. 24, 1906.

14 SHEETS—SHEET 11.

Witnesses
Max B. A Doring
Frank L. Hutt.

William F. Hutchinson, Inventor
By his Attorney W. P. Hutchinson

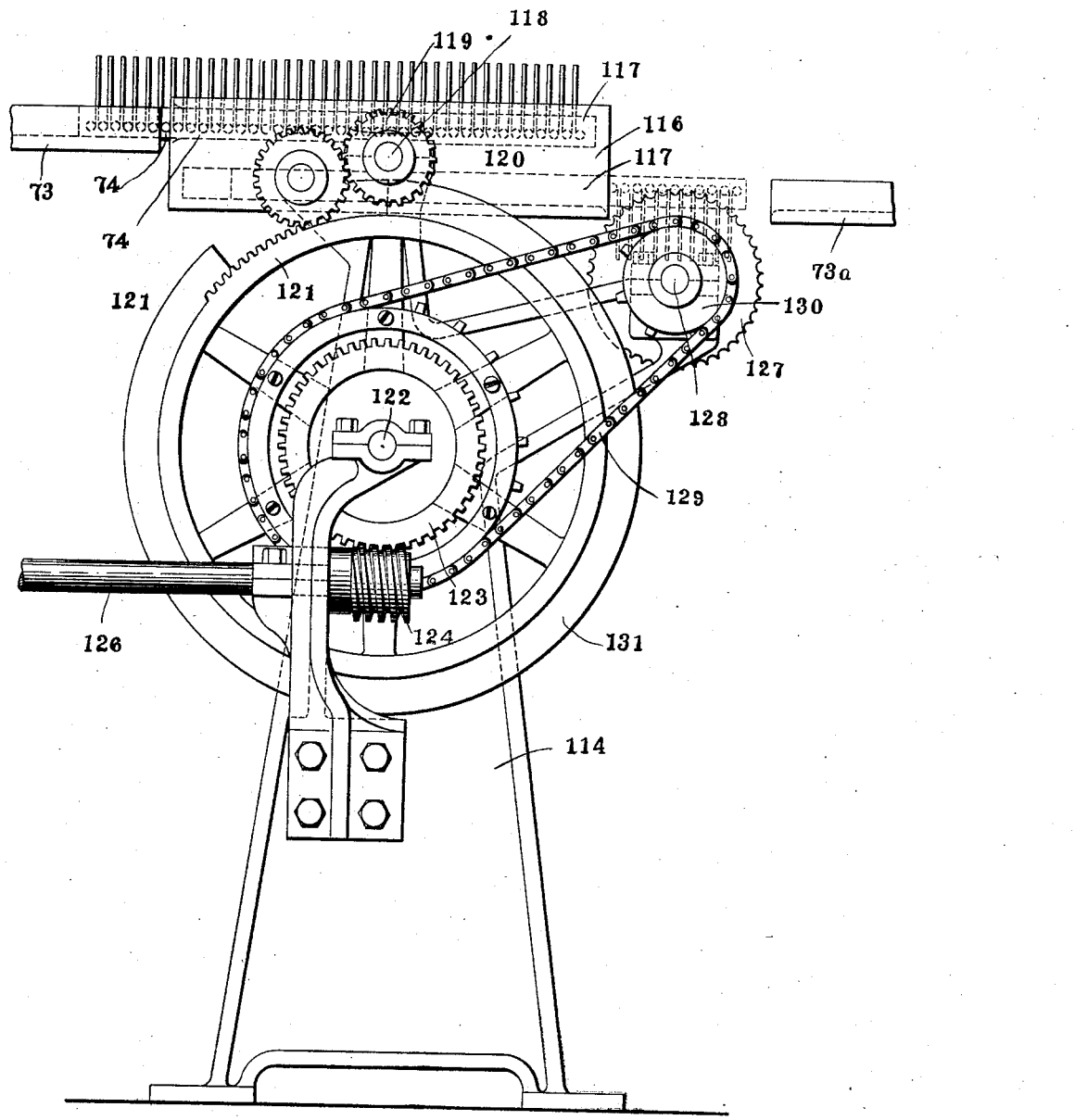

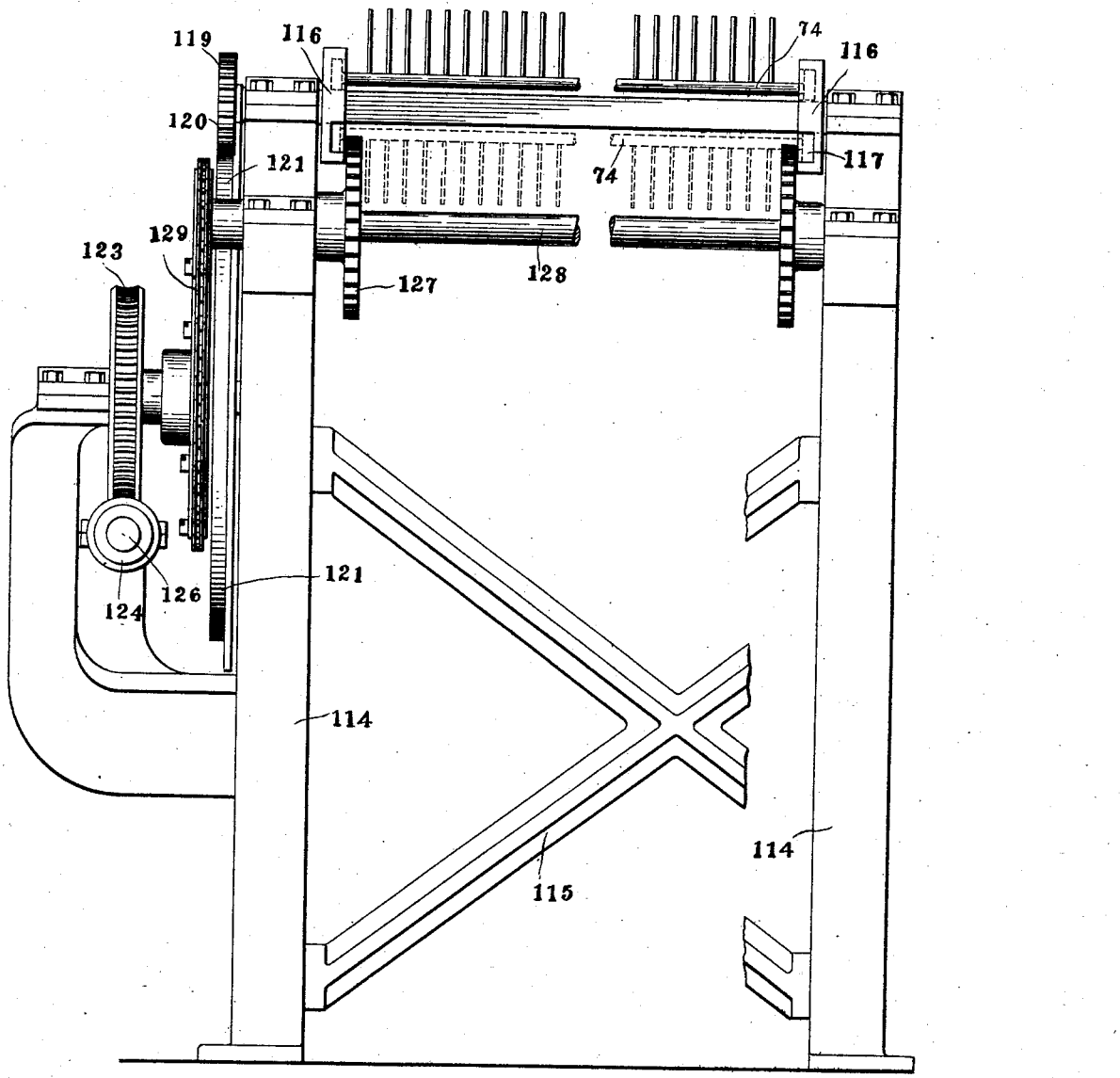

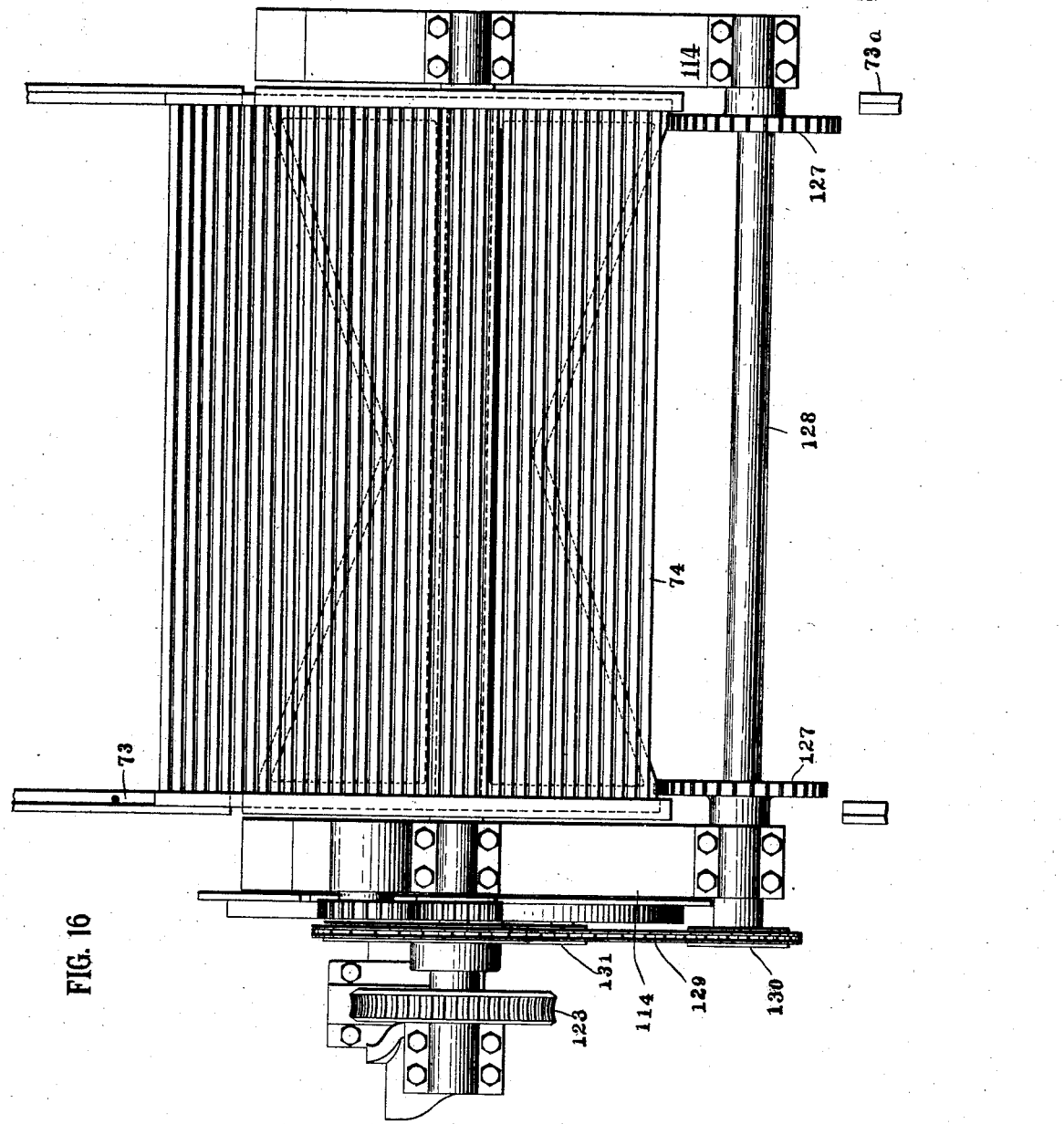

UNITED STATES PATENT OFFICE.

WILLIAM F. HUTCHINSON, OF NYACK, NEW YORK, ASSIGNOR TO SARNIA MATCH COMPANY, OF SARNIA, ONTARIO, CANADA, A CORPORATION OF CANADA.

MATCH-MACHINE.

No. 866,650.          Specification of Letters Patent.          Patented Sept. 24, 1907.

Application filed October 24, 1906. Serial No. 340,315.

*To all whom it may concern:*

Be it known that I, WILLIAM F. HUTCHINSON, of Nyack, Rockland county, New York, have invented a new and Improved Match-Machine, of which the following is a full, clear, and exact description.

My invention relates to improvements in that class of match machines known as continuous machines, and in which the matches are made in the form of so called round splints which are cut from blocks of wood.

The object of my invention is to produce a machine of this class which is adapted to work with great rapidity, and in which a whole series of continuously moving cutters are arranged to intersect the stock feed, then place the formed splints in a clutch mechanism and carry the splints to first one side of the machine and then the other, where they are delivered into carriers, and moved forward into the kiln ready for dipping. By making the machine so that the cutting is continuous and the carrying mechanism is duplicated at the sides of the cutting mechanism, I get great speed, and am enabled to cut matches and make them complete much faster than with ordinary apparatus.

My invention is also intended to arrange the parts so that they will not be likely to clog up and get out of order.

With these ends in view, my invention consists of certain features of construction and combinations of parts which will be hereinafter described and claimed.

Reference is to be had to the accompanying drawings forming a part of this specification, in which similar figures of reference indicate corresponding parts in all the views.

Figure 2:
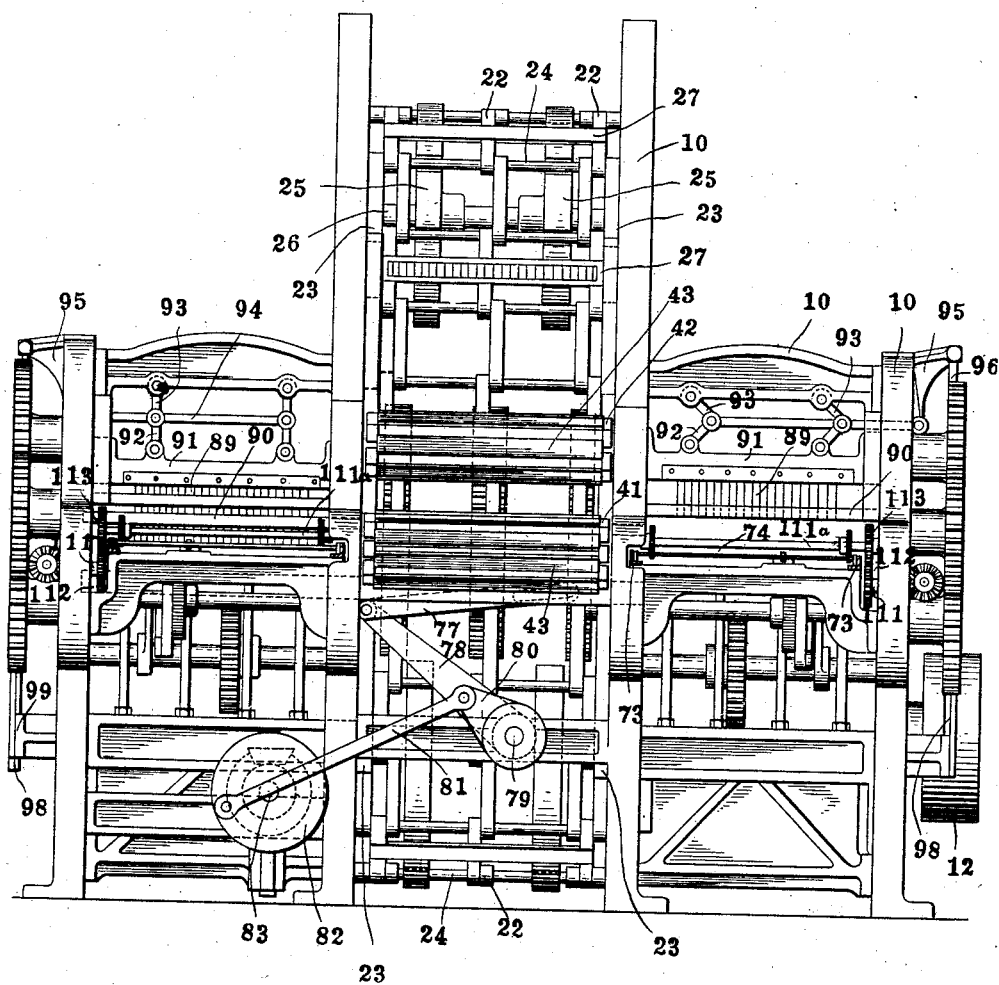
Figure 3:
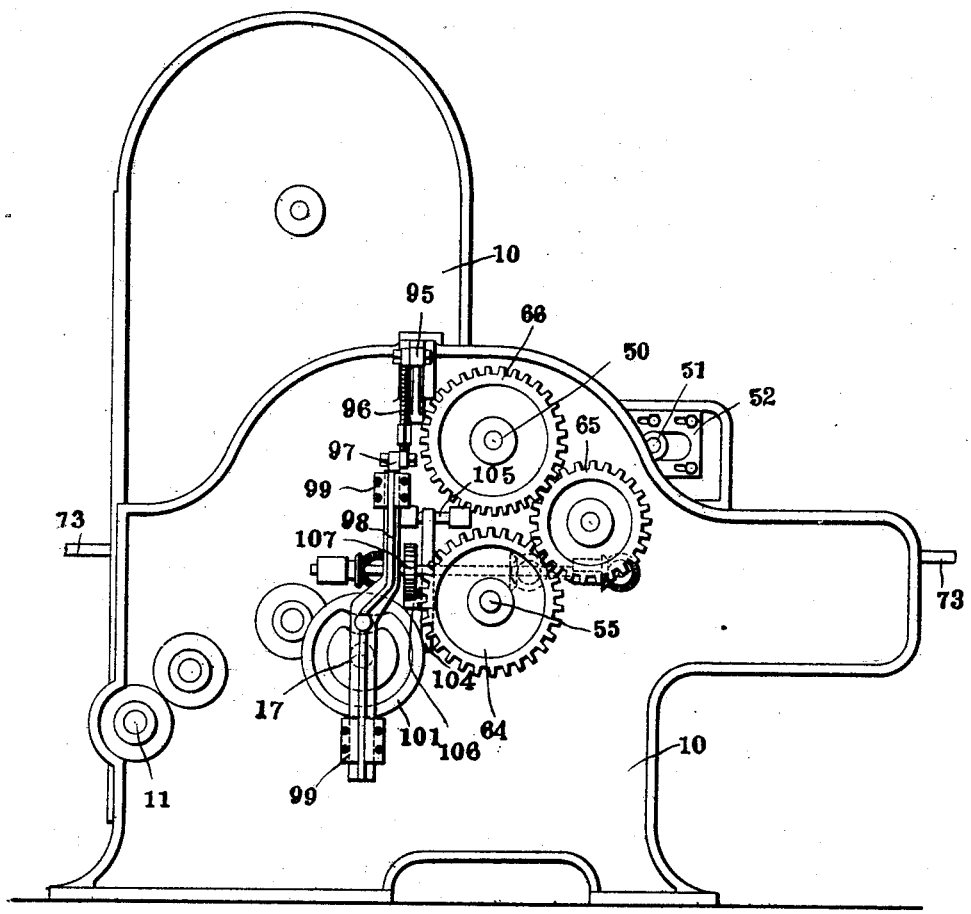
Figure 4:
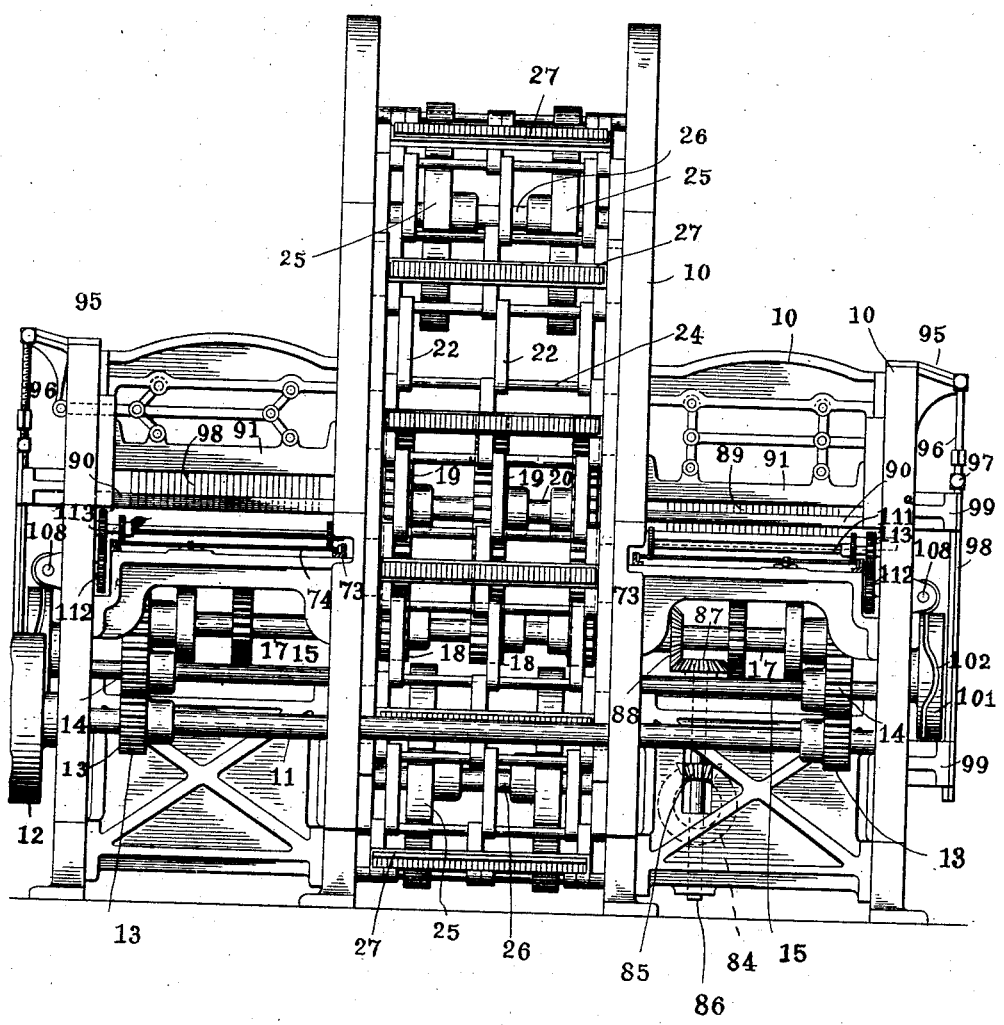
Figure 5:
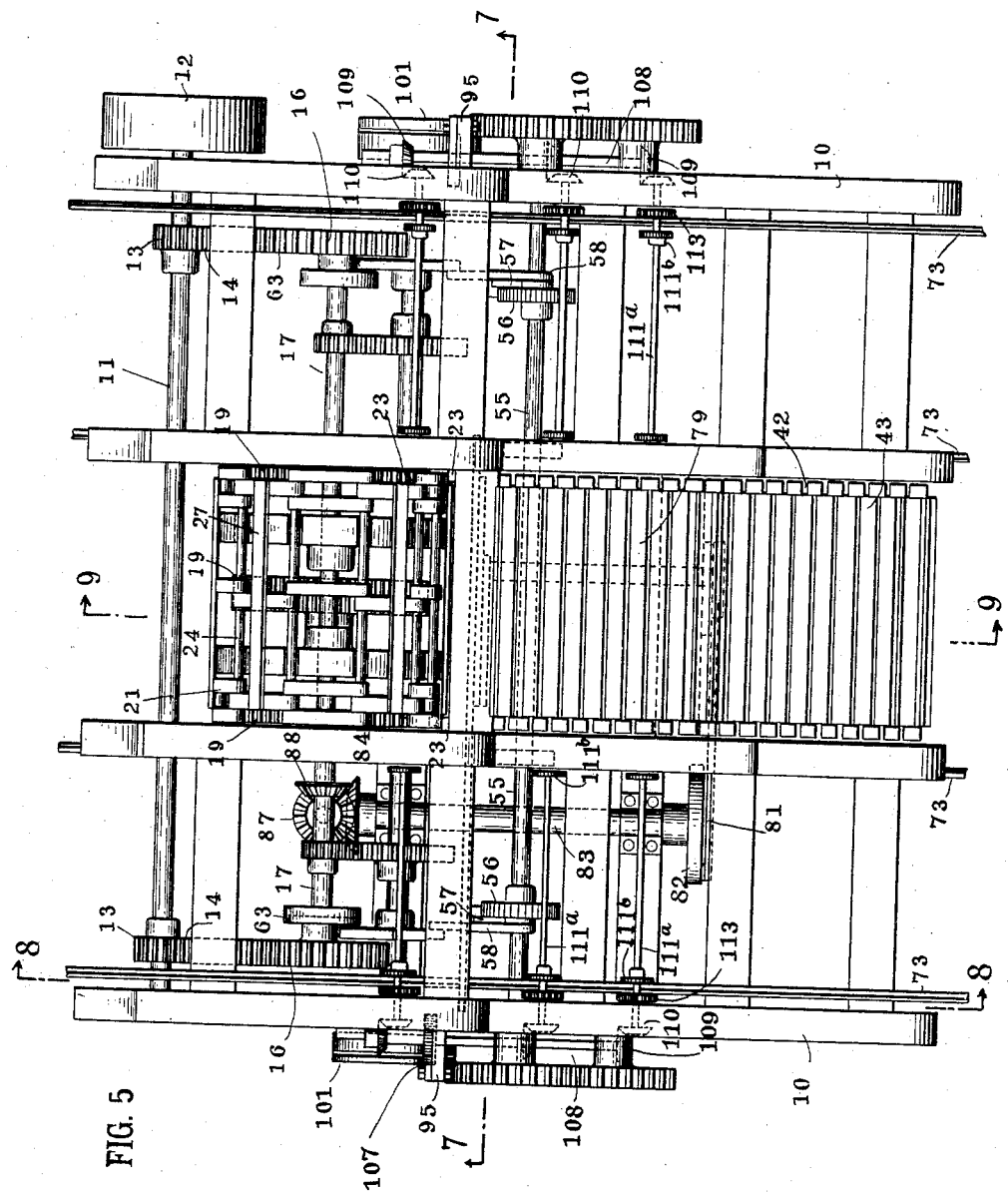
Figure 6:
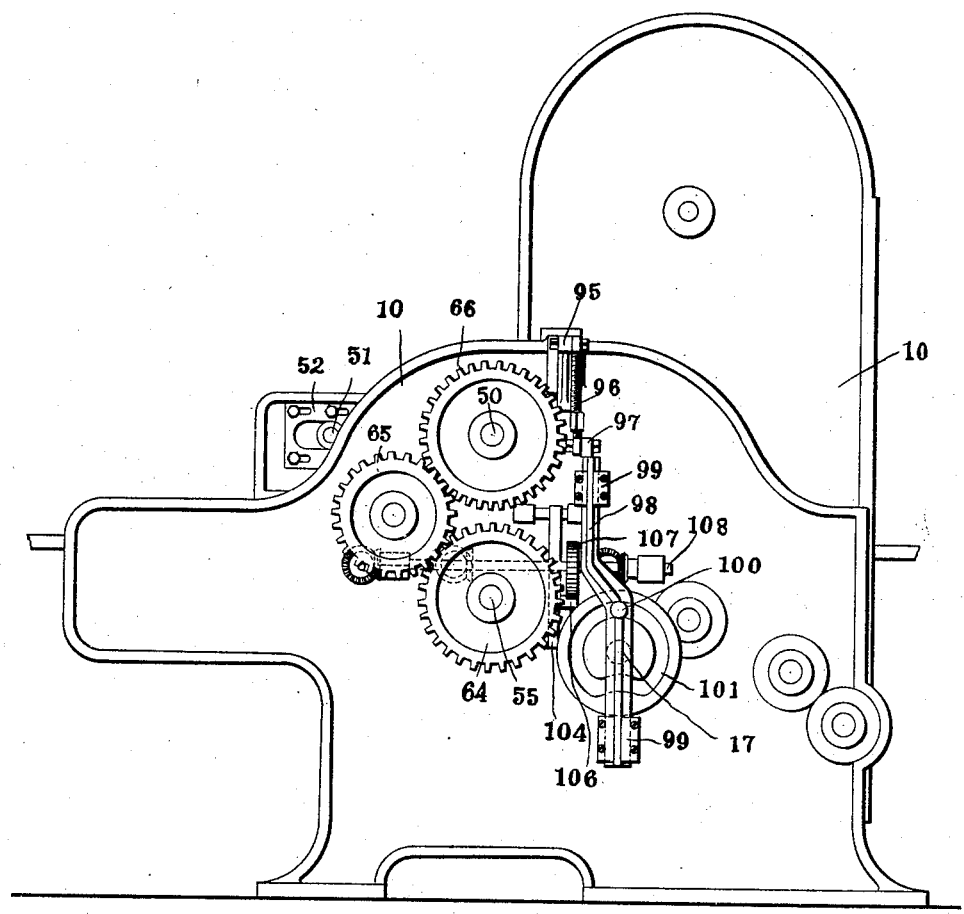
Figure 7:
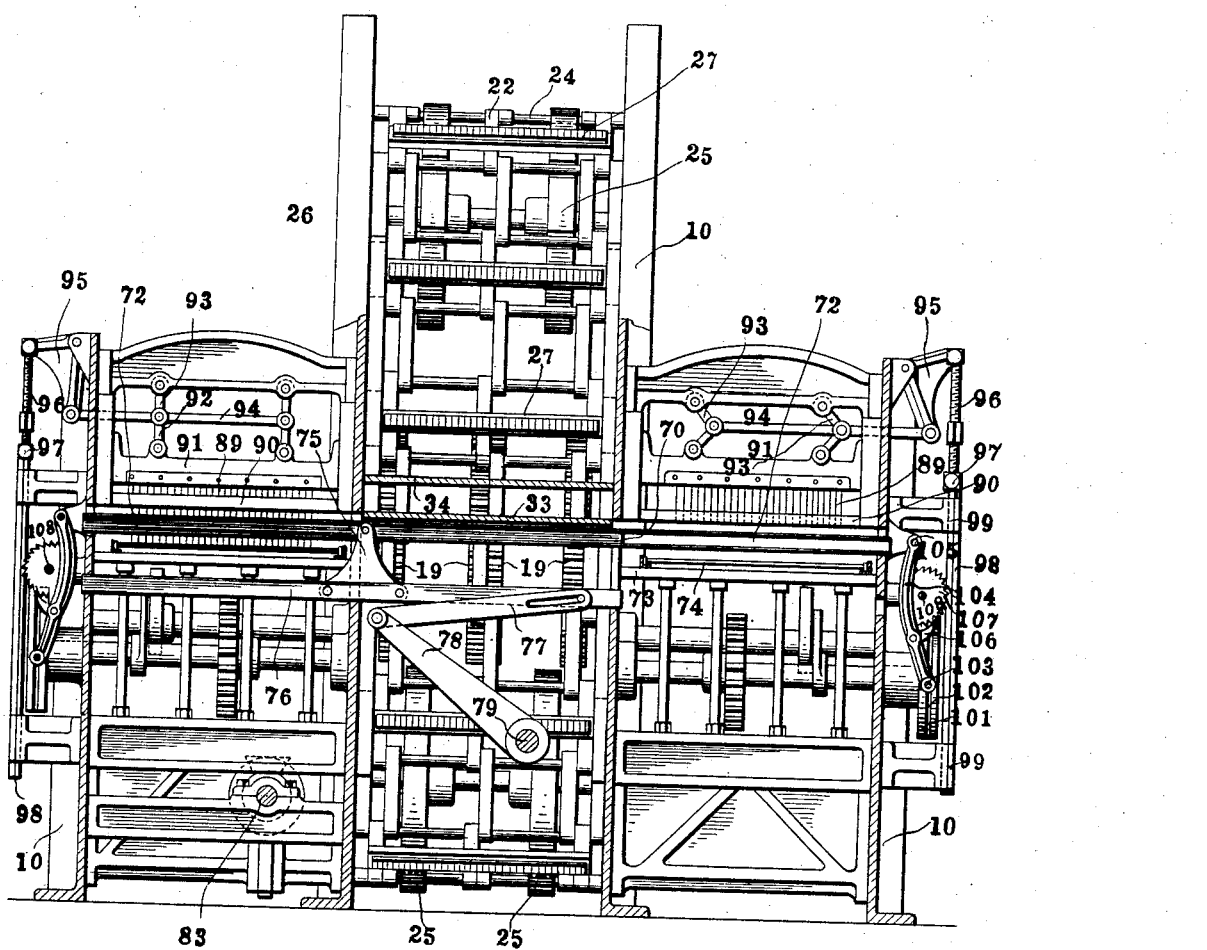
Figure 8:
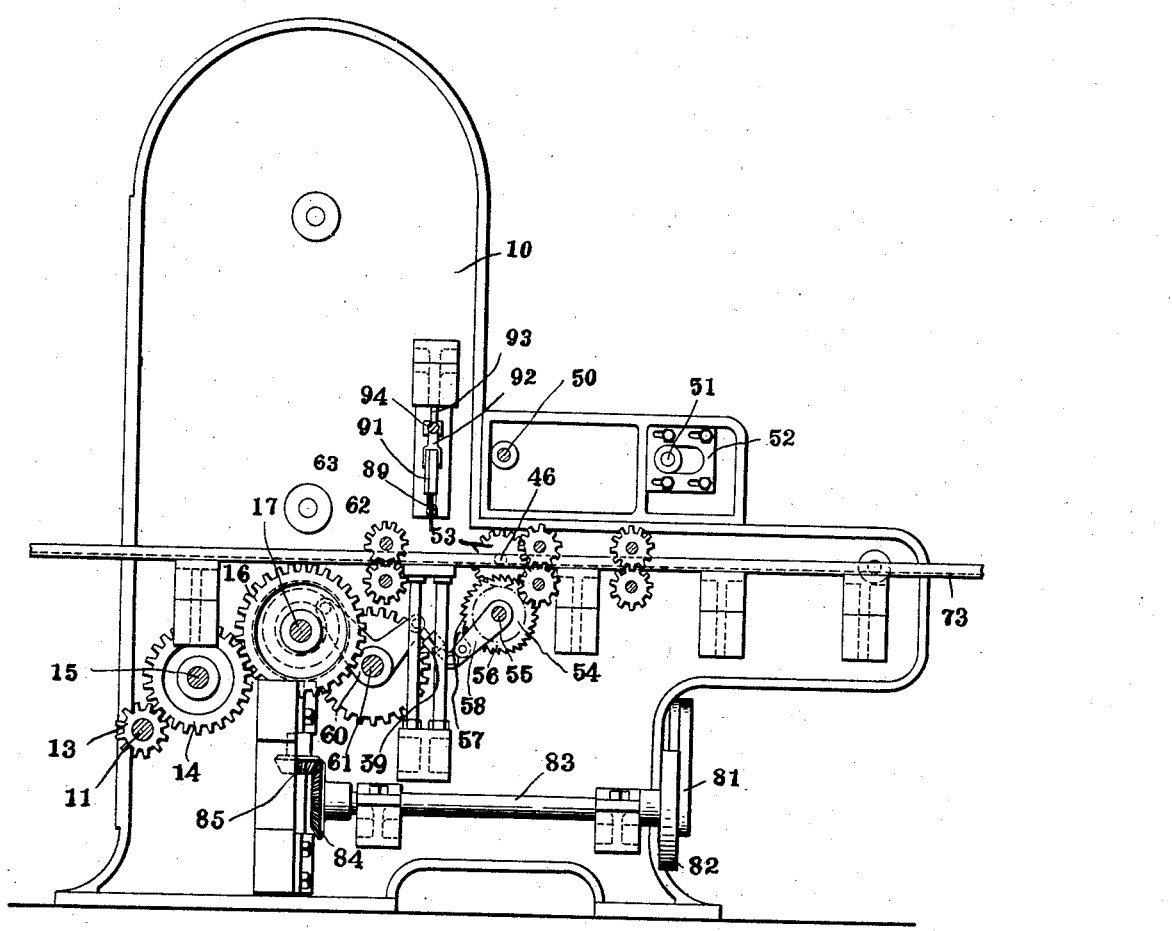
Figure 10:
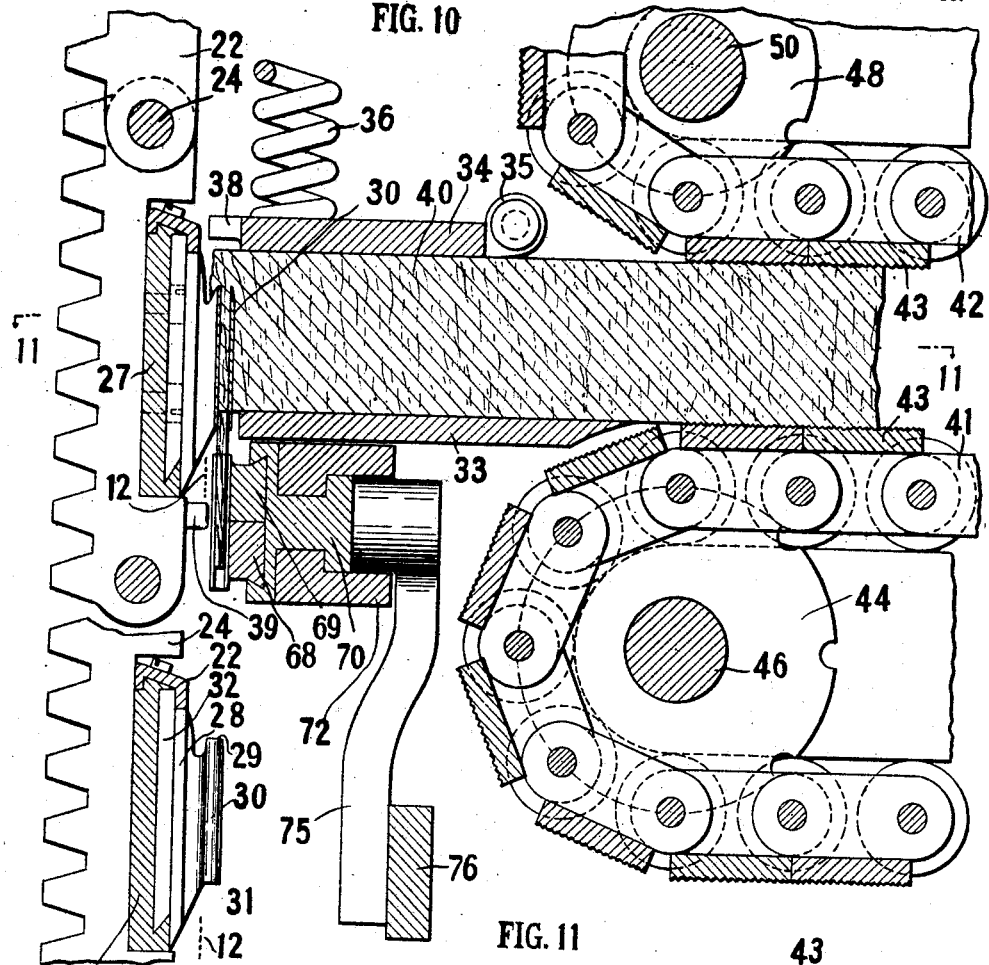
Figure 11:
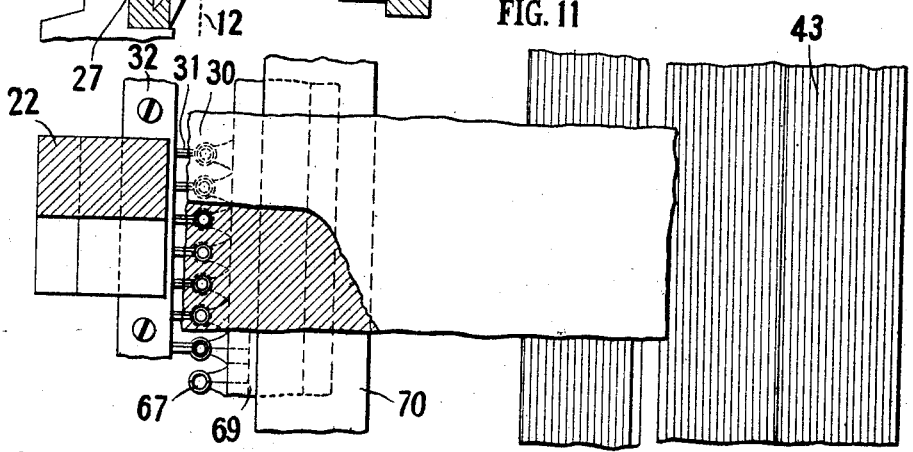
Figure 12:
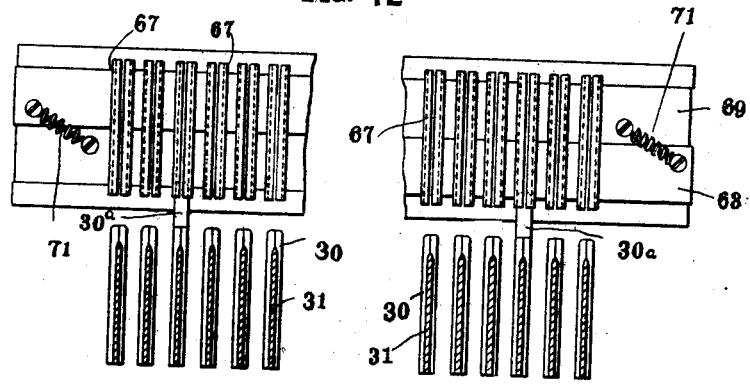
Figure 13:
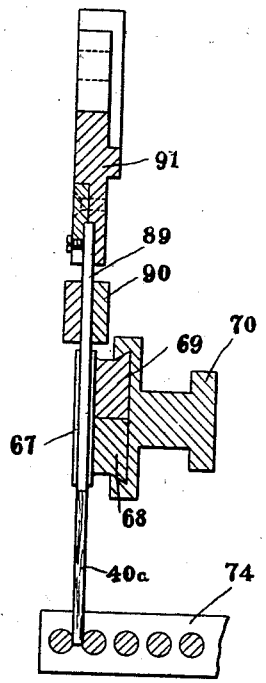

Figure 1 is a diagrammatic elevation of the complete machine, showing it in connection with a kiln. Fig. 2 is a front elevation of the machine. Fig. 3 is a left-hand side elevation. Fig. 4 is a rear elevation of the machine. Fig. 5 is a plan view of the machine. Fig. 6 is a right-hand elevation of the machine. Fig. 7 is a cross sectional elevation on the line 7. 7 of Fig. 5. Fig. 8 is a longitudinal section on the line 8. 8 of Fig. 5. Fig. 9 is a central longitudinal section on the line 9. 9 of Fig. 5. Fig. 9ª is a detail section showing the guides for the chains which carry the knife bars. Fig. 10 is an enlarged detail sectional view of the cutting mechanism, showing the cutter bar with its knives and the clutch bar with its gripping clamps, the same being an enlarged view of the parts shown in Fig. 9. Fig. 11 is a sectional plan on the line 11. 11 of Fig. 10. Fig. 12 is a detail of the cutters and splint grippers or clutches, being a section on the line 12. 12 of Fig. 10. Fig. 13 is a detail section of the plunger and clutch mechanism. Fig. 14 is a right-hand side elevation of the turn-table for tipping over the splint frames or carriers. Fig. 15 is a front elevation of the turntable, and Fig. 16 is a top plan of the turntable.

The machine has a suitable frame 10, and in the lower part and arranged transversely is a driving shaft 11, which has a suitable pulley 12, or other means of driving it. The shaft connects by gears 13 and 14, the latter serving as an idler, with a counter shaft 15 (see Fig. 8) and the gear 14 drives a gear wheel 16 on the shaft 17, which is also arranged transversely in the machine. This shaft connects by gears 18, with the large gears 19 which are carried on the short shaft 20, and the three gears 19 mesh with the three series of links 21, forming a chain which carries the cutter mechanism, the gear wheels 19 connecting with the chain on opposite sides as shown in Fig. 9, so that the movement is extremely positive, and the links 21 of the chain have firm gear teeth 22 on their inner or back sides for the purpose stated. The chain links are pivoted together by cross rods 24, and to make the movement of the chains absolutely positive where they carry the knife bars past the stock, as hereinafter described, guides 23 (see Fig. 9ª) are arranged on the sides of the machine to engage and steady the outer series of links. The cutter chains run over large sprocket wheels 25, which are mounted on idle shaft 26 at the upper and lower parts of the machine as shown clearly in Figs. 7 and 9. Each horizontal series of links 22 carries a cutter bar 27, which is securely fastened to the links, and the cutter bar is dove-tailed to receive a plate 28 carrying the base flanges 29 of the cutters 30, these being cylindrical in cross section, hollow and sharpened at the upper edge, as shown best in Fig. 10. Each cutter has a reduced neck 31, and the cutters and the plate 28 are fastened to the cutter bars 27 by the clamping pieces 32 which are screwed to the several cutter bars. The cutters 30 are placed side by side and are adapted to be carried upward through the stock 40, which should be a pine block, and the stock is fed forward between the feed plates 33 and 34, which are arranged just out of line with the cutters 30 (see Fig. 10), and the upper plate 34 is hinged as shown at 35, and is normally pressed down by the heavy spring 36 which is stiff enough to resist the pressure of the upwardly driven cutters 30. The spring 36 is backed by a suitable abutment 37 (see Fig. 9).

On one end of the feed plate or pressure plate 34 is a finger 38, and on each of a series of links 22 just below the cutters is a second finger 39, and so after the cutters have passed through the stock, the finger 39 strikes the finger 38, lifts the feed or pressure plate 34, and thus permits the stock 40 to be fed forward for the next series of cutters. The stock 40 is fed forward to the feed or pressure plates 30 and 34 by the oppositely arranged stock carriers formed essentially of chains 41 and 42, the adjacent members of which are parallel with each other, and both chains carry gripping plates 43 so that the stock is held firmly between the said plates. For convenience the lower feed chain is longer than the upper (see Fig. 9), so that the stock can be laid conveniently upon it. The lower chain is carried by sprocket wheels 44 and 45 which are secured to shafts 46 and 47, and the upper chain is carried by sprocket wheels 48 and 49 secured to shafts 50 and 51. The shaft 51 is secured to an adjustable plate 52 (see Fig. 8) by means of which the chain can be conveniently tightened. The shaft 46 is driven by gear wheel 53 (see Fig. 8) which connects with a gear 54 shown by dotted lines in the same figure, this being carried by shaft 55 on which is a ratchet wheel 56 worked by a pawl 57 on the arm 58 and the latter is pivoted on the shaft 55 and connects by a turn buckle 59 with the bell-crank 60, which turns free on the shaft 61, and the latter has at one end a roller 62 running in a groove of the cam 63, which is secured to the shaft 17, already referred to. The upper shaft 50 of the feed chains is driven by a train of gearing 64, 65 and 66, connecting it with the shaft 55 as shown in Figs. 3 and 6.

When the cutters 30 have passed through the stock 40 and become filled with stock, they will on the next revolution or on their next contact with the stock, cause the splints which they carry to be pushed out by the new stock coming into the cutters, and the splints are received by the splint clutches 67 which are formed of two separate parts adapted to grip a round splint and the parts of each clutch are attached respectively to the slide plates 68 and 69 which are drawn by a spring 71 so as to hold the two parts of the clutches or grippers 67 together. When the cutters 30 are carried upward, they pass through the grippers or clutches 67, and to this end several of the cutters have extensions 30$^a$ (see Fig. 12) which first enter a clutch and so spread all the clutches by reason of the moving of the sliding plates 68 and 69, and after this the narrow necks 31 of the cutters pass up between the open parts of the clutches. When, however, the cutters have passed through the clutches, the splints which have been forced out, as above stated, are gripped by the clutches ready to be carried over and deposited in the match frames or carriers, as presently described.

The slide plates 68 and 69 are dove-tailed into the slide bars or clutch bars 70, which move in a guide track 73, extending entirely across the machine as shown clearly in Fig. 7, and by reference to the same figure it will be seen that the clutch bar 70 is long enough to extend from one side of the machine across the cutting mechanism, and so when it is moved in one direction it brings a quantity of the clutches or grippers 67 into a position to have the splints removed and brings another portion of the said grippers into a position to receive fresh splints, and on the next movement the clutch bar goes to the opposite side of the machine where the operation is repeated.

The clutch bars can be moved in any convenient way to bring the clutches opposite the carrier frames 74, which move in the tracks 73 extending through the machine longitudinally, and I have shown the clutch bars connected to a link 75 which is rigidly attached to the slide plate 76 moving in a suitable way, and this slide plate has a sliding connection with a pitman 77 which is in turn pivoted to the oscillating crank 78 on the shaft 79, this being arranged in suitable bearings longitudinally of the machine and having at one end a second and shorter crank 80 which connects by a second pitman 81 with a disk 82 on the shaft 83, which runs parallel with the shaft 79, as shown in Fig. 2. The shaft 83 connects by means of the beveled gear wheels 84 and 85 (see Fig. 4) with a vertical shaft 86 which is in turn driven by the gears 87 and 88 connecting with the shaft 17 already referred to.

After the match splints are removed to a point above the carrier frames, it is necessary to eject the matches from the clutches 67, and I do this by mechanism substantially like that shown in my application for Letters Patent #334,607, filed September 14, 1906. The connections with the plunger mechanism, however, are different, and I will describe it in order that the matter may be clear. The plungers 89 shown in Figs. 2, 4, 7 and particularly 13, work through guide bars 90 and reciprocate vertically so that when depressed they push the splints 40$^a$ (see Fig. 13) from the grippers 67 and between the rods of the carrier frames. The plungers can be operated in any convenient way, but as shown they are attached to cross heads 91, one on each side of the machine, and each cross head connects by toggle levers 92 and 93 with the frame of the machine above the cross head, while the toggles are at their junctions pivoted to a slide rod 94 which moves horizontally in the machine and is pivoted to a tilting bell crank 95, this being pivoted on the outer side of the machine frame. The bell crank 95 connects by a rod 96, preferably in the form of a screw turn buckle, and by a link 97 to the slide rod 98, which moves vertically in ways 99 (see Figs. 6 and 7) and the slide rod connects by means of a roller 100 with a groove in a cam 101, so that the turning of the cam actuates the slide rod and through it the bell crank 95, rod 94, and plunger cross head 91. The cam 101 is carried by the shaft 17, already referred to. The cam 101 is a double cam having a groove 102 on its periphery, which groove has a lateral bend therein, and this groove receives the roll 103 on the end of the lever 104 (see Fig. 7) which is pivoted at its end as shown at 105, and has a pawl 106 connecting with a ratchet wheel 107 on the shaft 108 which is mounted in suitable bearings on the side of the machine. This arrangement is also carried out on both sides of the machine and is for the purpose of feeding the carrier frames through the machine. Each shaft 108 (see Fig. 5) connects by gears 109 and 110 with shaft 111, and these by gears 112 and 113 with shafts 111$^a$ which extend across the tracks 73 and have gears 111$^b$ which engage the cross rods of the carrier frames and so drive the frames through the machine. This frame driving mechanism just described is not new, and it is described merely for clearness.

Referring to Fig. 1 it will be seen that the machine as an organization has three elements, the match machine proper A, the turn-table B, and the kiln C. The kiln I have covered by separate application, Ser. No. 340,317, filed Oct. 24, 1906 but the turn-table is used in connection with the machine and forms a part thereof. When the match splints issue from the machine they project upward from the carrier frames 74, and it is necessary to tip the frames over so that the match splints will be in the proper position for dipping. To this end I use the turn-table shown in Figs. 14 to 16. This structure comprises what is preferably a separate frame 114, the side pieces being connected by cross braces 115, and the frame may of course be of any suitable kind. At the top of the frame is mounted the turn-table 116 which is adapted to tip entirely over and which is provided with two similar recesses or pockets 117, each adapted to receive a frame 74 but being of less length than the frame so that when the frame has reached the end of its recess 117, it still will rest on the track 73 from which it has passed to the turn-table. These recesses 117 are oppositely arranged one above the other, that is one opens from one end of the turn-table and the other from the opposite end of the turn-table, and each is closed at one end. The turn-table is secured to the trunnions 118, which connect by gears 119 and 120 with the mutilating gear wheel 121, which has teeth for only a short portion of its circumference (see Fig. 14) and consequently when the teeth of the gear wheel 121 engage the teeth of the gear wheel 120, the turn-table will be tipped over to the position shown in dotted lines in Fig. 14, and by having the track 117 shorter than the frame 74 as already stated, the part of the frame which protrudes is brought into engagement with the spur wheels 127, to be presently referred to.
The gear wheel 121 is secured to the shaft 122, which carries a worm wheel 123, which is driven by a worm 124 on the shaft 126. The spur wheels 127 already referred to are secured to a shaft 128 which is mounted in suitable bearings and is driven by a chain 129, connecting with a sprocket wheel 130 on the shaft 128, and with a sprocket wheel 131 on the shaft 132. It will be seen that one of the tracks or pockets 117 will register with the track 73, while the lower one alines with the track 73ª, which leads into the kiln C. Consequently at each turn of the table a frame 74 will be tipped over into alinement with the track 73ª and into engagement with the spur wheels 127.

From the foregoing description it will be seen that I have devised a machine which is adapted to work with remarkable rapidity, that the cutting mechanism works continuously and uninterruptedly, that is without any intermittent motions, that the stock is fed positively forward between each series of cutters, and that I am enabled to drive the machine rapidly as to the cutting because largely of the fact that the splints are alternately transferred to first one carrier and then another, so that the cut splints can thus be readily taken care of. In this way I get a plural carrier system working from a single rapid cutting mechanism, and while the machine looks complicated in the drawings because of the duplication of many parts, it is very simple in operation.

It will be understood that the driving mechanism illustrated for driving the different parts is unimportant, and very many different mechanisms might be used for the same purpose. The important thing is the arrangement of the cutting mechanism of itself, and in relation to the carriers, the details of the cutting mechanism, and the feed, also the details of the mechanism for gripping the splints and transferring them to the carriers, but the system of ejecting the splints from the grippers into the carrier frames and of operating the carrier frame, is not new.

Having thus fully described my invention, I claim as new and desire to secure by Letters Patent:—

1. A match machine comprising a single splint cutting mechanism, a carrier for matches on each side of the splint cutting mechanism, a clutching device to grip the splints as they are cut and carry them to the splint carriers, and means for discharging the splints from the clutch and into the carriers.

2. In a match machine, the cutting mechanism comprising a stock feed, several series of cutters spaced apart and intersecting the stock feed, and a clutching device moving between the several series of cutters to grip the splints severed by the cutters.

3. A match machine comprising a stock feed, several series of cutters spaced apart and intersecting the feed, each series comprising a group of individual hollow cutters, and clutching devices moving between the several series of cutters to clutch the severed splints.

4. In combination, a cutting mechanism, a kiln, carriers delivering from the cutter mechanism to the kiln and means for inverting the carriers before they deliver to the kiln.

5. A match machine comprising several series of cutters spaced apart, each series comprising a group of individual hollow cutters, the said cutters moving forward without interruption, means for feeding the stock between each group of cutters, and clutching devices independent of the cutters to engage the individual splints as they are severed by the cutters.

6. A match machine comprising a series of cutters spaced apart and moving constantly forward, feed or pressure plates for stock, means for feeding the stock between the pressure plates, and automatic means for relieving the pressure of the plates as each cutter passes said plates.

7. In a match machine the combination with the movable cutters spaced apart, of the stock feed to deliver stock between the cutters, the feed or pressure plates to hold the stock, one of said plates being hinged, and means moving with the hinges to tilt the said hinged plate as each series of cutters passes it.

8. In a match machine the combination with the forwardly moving hollow cutters, of the stock feed to move stock into the path of the cutters, splint clutching devices in the path of the cutters and adjacent to the stock, and means for opening and closing the clutching devices as the cutters approach and pass through them.

9. The combination with the stock feed and the hollow cutters arranged to pass through the stock, of splint clutches opposite the stock and in the path of the cutters the said clutches opening as the cutters pass through them and closing to grip the splints ejected by the cutters.

10. The combination with the movable cutters arranged to pass through the stock, of individual splint clutches in the path of the cutters and near the stock, said clutches being each expansible and arranged to open for the passage of the cutter through it and to close so as to grip the splints ejected by the cutter.

11. The combination with the hollow cutters arranged to pass through the stock, of the expansible clutches in the path of the cutters through which the cutters pass to engage the stock, and means for opening the clutches as the cutters approach them.

12. The combination with the hollow cutters, each having a neck, of the expansible clutches arranged in the path of the cutters, and provided with openings for the passage of the cutter necks.

13. In a match machine the combination with the stock feed and the cutters intersecting the feed and passing through the stock, of the clutch bar reciprocating laterally between the series of cutters and having clutches to receive the individual splints, and carriers to receive the splints from the clutches.

14. In a match machine the combination with the cutters arranged to pass through the stock, of a clutch bar reciprocating laterally between the series of cutters, slide plates on the clutch bars, said plates being moved in relation to each other, clutches consisting of separable parts to receive the splints, the two parts of each clutch connecting with the different slide plates, and means for discharging splints from the clutches.

15. In combination with the hollow cutters arranged to pass through the stock, of the expansible clutches in the path of the cutters through which the cutters pass to engage the stock and means carried by the cutters for opening the clutches as the cutters approach them.

16. In combination with hollow cutters arranged to pass through the stock, of the expansible clutches in the path of the cutters through which the cutters pass to engage the stock and extensions on the cutters for opening the clutches as the cutters approach them.

17. A match machine comprising several series of cutters spaced apart and moving continuously forward, each series comprising a group of individual hollow cutters, a stock feed to deliver said stock between each series of cutters and clutching devices moving between the several series of cutters to clutch the severed splints.

18. In a match machine, the combination with movable cutters spaced apart, of the stock feed to deliver stock between the cutters, the feed or pressure plates to hold the stock, one of said plates being hinged, means moving with the cutters to tilt said hinged plate as each series of cutters passes it and means to return the plate after each series of cutters have passed.

19. In a match machine, the combination with movable cutters spaced apart, of the stock feed to deliver stock between the cutters, the feed or pressure plates to hold the stock, one of said plates being hinged, means moving with the cutters to tilt said hinged plate as each series of cutters passes it and spring means for returning the plate after each series of cutters has passed.

20. In a match machine, the combination with the endless chains and means for driving them a series of cutters spaced apart and carried by the chains, feed or pressure plates for stock, one of said plates being hinged and means carried by the chains to tilt the hinged plate as each series of cutters passes it.

21. In a match machine, the combination with the endless chains and means for driving them, a series of cutters spaced apart and carried by the chains, feed or pressure plates for the stock, one of said plates being hinged and projections carried by the chains to tilt the hinged plate as each series of cutters passes.

22. A match machine comprising chains, wheels around which the chains are passed, gear wheels interposed between the aforesaid wheels and engaging the chains, a stock feed, said gear wheels being opposite the stock feed, and several series of cutters supported on the chains, said stock feed being adapted to deliver stock between the several series of cutters.

23. A match machine comprising chains, the inner edges of said chains being toothed, wheels around which the chains are passed, gear wheels engaging the toothed edges of the chains, a stock feed, and several series of cutters supported on the chains, said stock feed being adapted to deliver stock between the several series of cutters.

24. A match machine comprising chains, wheels around which said chains pass, gear wheels interposed between the aforesaid wheels engaging the chains, a stock feed, and several series of cutters supported on the chains, said stock feed being adapted to deliver stock between the several series of cutters.

WILLIAM F. HUTCHINSON.

Witnesses:
WARREN B. HUTCHINSON,
FRANK L. STUBBS.